(12) United States Patent
Imoto et al.

(10) Patent No.: US 6,830,818 B2
(45) Date of Patent: Dec. 14, 2004

(54) POLYMER MATERIAL AND POLYMER FILM

(75) Inventors: Katsuyuki Imoto, Saitama (JP); Hiroshi Tsushima, Osaka (JP); Emi Watanabe, Osaka (JP)

(73) Assignees: Hitachi Cable, Ltd., Tokyo (JP); Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 10/103,129

(22) Filed: Mar. 22, 2002

(65) Prior Publication Data

US 2002/0177660 A1 Nov. 28, 2002

(30) Foreign Application Priority Data

Apr. 13, 2001 (JP) ........................................ 2001-115652
Apr. 13, 2001 (JP) ........................................ 2001-115653

(51) Int. Cl.$^7$ ................................................. B32B 9/04
(52) U.S. Cl. ........................ 428/447; 427/387; 525/477; 525/488; 528/22; 528/33; 528/34
(58) Field of Search .................... 428/447; 427/387; 525/477, 488, 478, 22; 528/22, 33, 34

(56) References Cited

U.S. PATENT DOCUMENTS

| | | | | |
|---|---|---|---|---|
| 5,370,906 A | * | 12/1994 | Dankert | ....................... 427/261 |
| 5,612,103 A | * | 3/1997 | Driehuys et al. | ........... 428/34.7 |
| 5,672,672 A | * | 9/1997 | Amano et al. | ................. 528/16 |
| 6,365,698 B1 | * | 4/2002 | Goldslager et al. | ............ 528/31 |

FOREIGN PATENT DOCUMENTS

| | | |
|---|---|---|
| EP | 0725315 A2 * | 8/1996 |
| JP | 6-222234 | 8/1994 |
| JP | 8-262728 | 10/1996 |
| JP | 11-287916 | 10/1999 |

* cited by examiner

Primary Examiner—David J. Buttner
Assistant Examiner—Christopher Keehan
(74) Attorney, Agent, or Firm—Foley & Lardner LLP

(57) ABSTRACT

A silicone compound, either alone or in combination with a photoacid generator, is added to a branched polysilane compound. According to this constitution, highly reliable polymer material and polymer film can be realized which have excellent stability of refractive index against heat and high transparency and, when the photoacid generator is contained, can cause a change in refractive index upon exposure to ultraviolet light with high sensitivity and high resolution.

20 Claims, 11 Drawing Sheets

FIG.9
| MAXIMUM ABSORPTION WAVELENGTH (nm) | RELATIVE SENSITIVITY | TRANS-MITTANCE (830 nm) | SOLUBILITY IN TOLUENE | CHEMICAL STRUCTURE OF SENSITIZER | REMARKS |
|---|---|---|---|---|---|
| | 1.00 | | | | |
| 377 | 1.62 | 1.0% | ○ 5% | 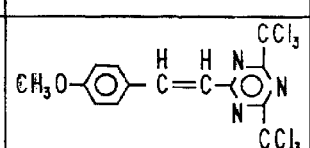 | |
| 248 328 | 1.17 | 100.0% | — | 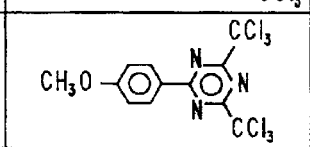 | |
| 356 | 1.31 | 99.0% | — | 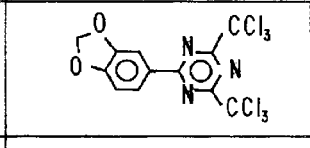 | |
| 332 | 1.75 | 100.0% | ○○ NOT LESS THAN 5% | 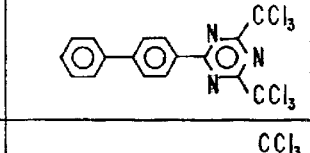 | |
| 357 | 1.40 | 100.0% | ○○ NOT LESS THAN 5% | 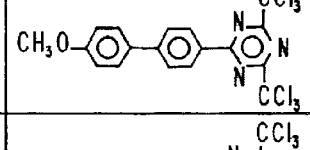 | PRECIPITATED FROM SILICONE |
| 339 | 1.50 | 99.0% | ○○ NOT LESS THAN 5% | 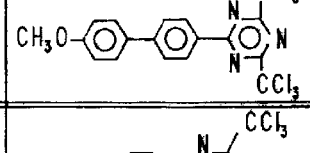 | |
| 265 382 | 1.58 | 97.5% | ○ 5% | 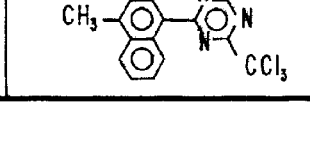 | PRECIPITATED FROM SILICONE | ns
POLYMER MATERIAL AND POLYMER FILM

BACKGROUND OF THE INVENTION

1. Field of the Invention

The invention relates to a polymer material and a polymer film.

2. Prior Art

In recent years, polymer materials having high light transmittance have become used, for example, in surface protection films for glasses, ceramics, plastics or the like, antireflection films, and filter films for optical communication. For example, PMMA (polymethyl methacrylate), polystyrene, epoxy, polyimide, silicone, and polysilane materials have been studied as polymer materials. These materials are desired to be less likely to undergo a change, for example, in refractive index or coefficient of thermal expansion upon a change in temperature. For this reason, among the above polymer materials, polyimide, epoxy, and polysilane materials have drawn attention, and an improvement in polymer materials has been attempted.

Examples of attempts include the use of a linear (straight-chain) polysilane material for optical applications (Japanese Patent Laid-Open No. 222234/1994), the use of amorphous polysilane (Japanese Patent Laid-Open No. 287916/1999), and the use of linear polysilane or branched polysilane (Japanese Patent Laid-Open No. 262728/1996).

The conventional materials, however, involve the following problems.

(1) These materials undergo a significant change in refractive index upon a change in temperature. Therefore, when optical components are formed of films of these materials, the optical components undergo a significant change in characteristics, and, consequently, desired performance cannot be obtained.

(2) The transparency is lower than that of glass materials.

(3) When electrical components or optical components are soldered to a portion near the polymer film at a temperature around 200° C., the refractive index of the polymer film is changed from the initial refractive index value and, even when the temperature is returned to the initial value, cannot be returned to the initial refractive index value.

(4) Even when an attempt is made to cause a significant change in refractive index of the polymer film through the application of ultraviolet light with quick response, a change in refractive index is discontinuous in relation with irradiation energy. This makes it difficult to cause a desired change in refractive index with high resolution by the irradiation energy of ultraviolet light.

SUMMARY OF THE INVENTION

Accordingly, it is an object of the invention to solve the above problems of the prior art and to provide highly reliable polymer material and polymer film.

According to the first feature of the invention, a polymer material comprises a branched polysilane compound and a silicone compound blended with the branched polysilane compound in a predetermined blending ratio.

In the polymer material according to the first feature of the invention, the branched polysilane compound preferably has a degree of branching of not less than 2% and not more than 50%.

In the polymer material according to the first feature of the invention, the blending ratio of the silicone compound to the polysilane compound is preferably 40 to 90% by weight.

In the polymer material according to the first feature of the invention, the polysilane compound may be a compound wherein a silicon atom is combined to silicon atoms, as well as to a hydrocarbon group, an alkoxy group, or a hydrogen atom.

In the polymer material according to the first feature of the invention, the polysilane compound may comprise a deuterated branched polysilane compound.

In the polymer material according to the first feature of the invention, the polysilane compound may comprise a partially or wholly halogenated branched polysilane compound.

In the polymer material according to the first feature of the invention, the silicone compound may be crosslinkable or comprise an alkoxy group.

In the polymer material according to the first feature of the invention, the silicone compound may comprise a deuterated silicone compound.

In the polymer material according to the first feature of the invention, the silicone compound may be a partially or wholly halogenated silicone compound.

The polymer material according to the first feature of the invention may be in the form of a solution of the above compounds dissolved in an organic solvent soluble with the compounds.

According to the second feature of the invention, a polymer film is produced by a process comprising the steps of:

either pouring the above polymer material solution into a mold in an environment not exposed to ultraviolet light, or coating the polymer material solution onto a substrate in an environment not exposed to ultraviolet light; and heat treating the mold or the coated substrate in the temperature range of 100 to 280° C. to cure the polymer material.

This polymer film may have an ultraviolet cut layer on its surface.

According to the first and second features of the invention, the addition of a silicone compound to a branched polysilane compound can contribute to improved transparency and thus can realize polymer materials and polymer films having high light transmittance.

According to the third feature of the invention, a polymer material comprises a branched polysilane compound and, blended with the branched polysilane compound, a predetermined amount of a silicone compound and a predetermined amount of a photoacid generator.

In the polymer material according to the third feature of the invention, the polysilane compound may be a compound wherein a silicon atom is combined to silicon atoms, as well as to a hydrocarbon group, an alkoxy group, or a hydrogen atom.

In the polymer material according to the third feature of the invention, the branched polysilane compound is preferably a polysilane compound having a degree of branching of not less than 2% and not more than 50%.

In the polymer material according to the third feature of the invention, preferably, the silicone compound is crosslinkable or comprises an alkoxy group and the blending ratio of the silicone compound to the polysilane compound is 40 to 90% by weight.

In the polymer material according to the third feature of the invention, preferably, the photoacid generator is a trichloromethyltriazine photoacid generator and the blending ratio of the trichloromethyltriazine photoacid generator to the polysilane compound is not less than 1% by weight and not more than 5.5% by weight.

In the polymer material according to the third feature of the invention, the polysilane compound may be a deuterated branched polysilane compound.

In the polymer material according to the third feature of the invention, the polysilane compound may be a partially or wholly halogenated polysilane compound.

In the polymer material according to the third feature of the invention, the silicone compound may be a deuterated silicone compound.

In the polymer material according to the third feature of the invention, the silicone compound may be a partially or wholly halogenated silicone compound.

The polymer material according to the third feature of the invention may be in the form of a solution of the compounds dissolved in an organic solvent soluble with the compounds.

According to the fourth feature of the invention, a polymer film is produced by a process comprising the steps of:

either pouring the above polymer material solution into a mold in an environment not exposed to ultraviolet light, or coating the polymer material solution onto a substrate in an environment not exposed to ultraviolet light; and heat treating the mold or the coated substrate in the temperature range of 100 to 280° C. to cure the polymer material.

The polymer film according to the fourth feature of the invention may be exposed to ultraviolet light to change the refractive index of the polymer film.

The polymer film according to the fourth feature of the invention may have an ultraviolet cut layer on its surface.

According to the third and fourth features of the invention, the addition of a predetermined amount of a silicone compound and a predetermined amount of a photoacid generator to a branched polysilane compound can realize substantially no change in refractive index upon a rise in baking temperature to about 250° C. or a rise in ambient temperature to about 250° C. during the use of the polymer material or the polymer film and, in addition, can cause a change in refractive index upon the application of ultraviolet light with high sensitivity and high resolution. The above effect improves with increasing the amount of the photoacid generator so far as the amount of the photoacid generator added is up to the upper solubility limit of the photoacid generator.

The larger the amount of the silicone compound to the branched polysilane compound added, the better the light transmittance. The addition of the silicone compound in an optimal blending ratio can improve the above effect.

The addition of a sensitizer is effective for enhancing the sensitivity of the polysilane compound to a change in refractive index upon the application of ultraviolet light. A photoreactive peroxide or photoacid generator is generally used as the sensitizer.

The photoacid generator is preferably a trichloromethyltriazine photoacid generator. Among trichloromethyltriazine photoacid generators, those, which exhibit high light transmittance in a long wavelength region and, in addition, have a maximum absorption wavelength close to the absorption wavelength of the polysilane in ultraviolet wavelength region and a high melting point, are particularly preferred from the viewpoint of improving, for example, the light transmittance of the polymer material and the polymer film, the sensitivity to a change in refractive index upon the application of ultraviolet light, and the stability of refractive index against heat.

BRIEF DESCRIPTION OF THE DRAWINGS

The invention will be explained in more detail in conjunction with the appended drawings, wherein:

FIG. 9 is a table showing the relationship between the structure of the sensitizer and the sensitivity and the like;

DESCRIPTION OF THE PREFERRED EMBODIMENTS

Figure 1:
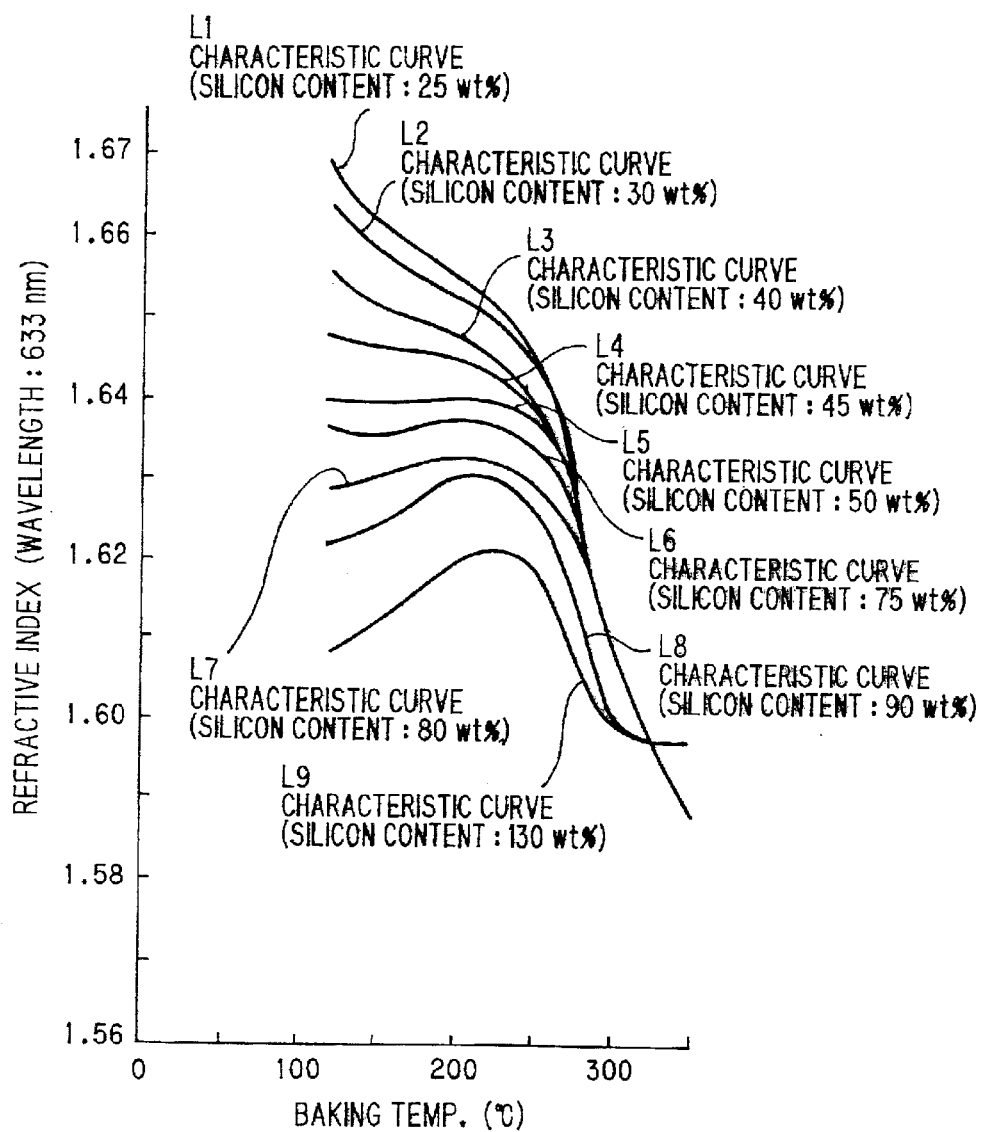
FIG. 1 is a characteristic curve showing the relationship between the baking temperature of polymer films using polymer materials according to the invention and the refractive index of the polymer films at a wavelength of 633 nm.

At the outset, materials used in the invention will be explained.

Branched Polysilane

The polysilane used in the invention is of branched type rather than linear (straight-chain) type. Branched polysilanes are distinguished from linear polysilanes by the state of attachment (bond) of silicon (Si) atoms contained in the polysilanes. Branched polysilanes are polysilanes containing a silicon atom(s) such that the number of bonds of the silicon atom to adjacent silicon atoms is 3 or 4.

On the other hand, linear polysilanes are polysilanes in which the number of bonds of a silicon atom to adjacent silicon atoms is 2.

Since the valency of the silicon atom is generally 4, silicon atoms having a number of bonds of 3 or less, among silicon atoms present in the polysilane, is combined to silicon atoms, as well as to a hydrocarbon group, an alkoxy group, or a hydrogen atom. Preferred hydrocarbon groups include aliphatic hydrocarbon groups having 1 to 10 carbon atoms optionally substituted by a halogen and aromatic hydrocarbon groups having 6 to 14 carbon atoms.

Specific examples of aliphatic hydrocarbon groups include chain-type aliphatic hydrocarbon groups, such as methyl, propyl, butyl, hexyl, octyl, decyl, trifluoropropyl, and nonafluorohexyl groups, and alicyclic hydrocarbon groups, such as cyclohexyl and methylcyclohexyl groups.

Specific examples of aromatic hydrocarbon groups include phenyl, p-tolyl, biphenyl, and anthracyl groups.

Alkoxy groups may have 1 to 8 carbon atoms, and specific examples thereof include methoxy, ethoxy, phenoxy, and octyloxy groups. Among these groups, methyl and phenyl groups are particularly preferred from the viewpoint of easiness of synthesis.

In the case of branched polysilanes, preferably, not less than 2% of the total number of silicon atoms in the branched polysilane is accounted for by silicon atoms in which the number of bonds of the silicon atom to adjacent silicon atoms is 3 or 4. When this proportion is less than 2% or in the case of linear polysilanes, the crystallinity is so high that crystallites are likely to be formed in the film. The formation of crystallites is causative of scattering and thus lowers the transparency. The upper limit of the degree of branching is preferably 50% from the viewpoint of the solubility of the branched polysilane in an organic solvent to prepare a polymer solution.

The polysilane used in the invention may be produced by a polycondensation reaction. In this polycondensation reaction, a halogenated silane compound is heated in the presence of an alkali metal, such as sodium, in an organic solvent, such as n-decane or toluene, at 80° C. or above, The polysilane used in the invention may also be synthesized by electrolytic polymerization or by a method using a metallic magnesium and a metal chloride.

In the case of the branched polysilane, a contemplated branched polysilane can be produced by heating a halosilane mixture comprising an organotrihalosilane compound, a tetrahalosilane compound, and a diorganodihalosilane compound to perform polycondensation. In this case, not less than 2% by mole of total amount of the halosilane mixture is accounted for by the organotrihalosilane compound and the tetrahalosilane compound.

Here the organotrihalosilane compound is a source for a silicon atom of which the number of bonds to adjacent silicon atoms is 3, and the tetrahalosilane compound is a source for a silicon atom of which the number of bonds to adjacent silicon 5 atoms is 4. In this connection, the network structure can be confirmed by the measurement of ultraviolet absorption spectra or nuclear magnetic resonance spectra of silicon.

The halogen atom possessed by the organotrihalosilane compound, the tetrahalosilane compound, and the diorganodihalosilane compound as the starting compounds for the polysilane is preferably a chlorine atom. Substituents other than the halogen atom possessed by the organotrihalosilane compound and the diorganodihalosilane compound include the above-described hydrocarbon groups, alkoxy groups, and a hydrogen atom.

This branched polysilane is soluble in an organic solvent and is not particularly limited so far as a transparent film can be formed by coating the branched polysilane. In this case, preferred organic solvents include hydrocarbon (with 5 to 12 carbon atoms) solvents, halogenated hydrocarbon solvents, and ether solvents.

Examples of hydrocarbon solvents include pentane, hexane, heptane, cyclohexane, n-decane, n-dodecane, benzene, toluene, xylene, and methoxybenzene. Examples of halogenated hydrocarbon solvents include carbon tetrachloride, chloroform, 1,2-dichloroethane, dichloromethane, and chlorobenzene. Examples of ether solvents include diethyl ether, dibutyl ether, and tetrahydrofuran, When a polysilane compound having a degree of branching of not less than 2% is used as the branched polysilane compound, the light transmittance increases with increasing the degree of branching of the branched polysilane compound. Deuterated or partially or wholly halogenated, particularly fluorinated branched polysilane compounds may also be used. Therefore, absorption at a specific wavelength can be suppressed, and the light transmittance is high over a wide wavelength range. In this case, when a photoacid generator is further contained, it becomes possible to cause a change in refractive index with high sensitivity and high resolution upon the application of ultraviolet light. Further, the stability of refractive index against heat can be improved. As described above, the upper limit of the degree of branching is preferably 50% from the viewpoint of the solubility of the branched polysilane in an organic solvent to prepare a polymer solution.

Silicone Compound

The silicone compound used in the invention is represented by formula

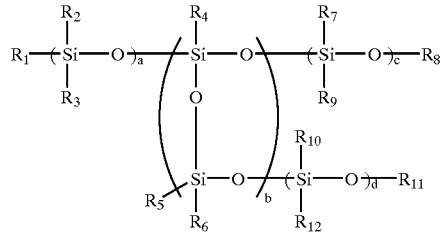

In the above formula, $R_1$ to $R_{12}$, which may be the same or different, represent a group selected from the group consisting of aliphatic hydrocarbon groups with 1 to 10 carbon atoms optionally substituted by a halogen or a glycidyloxy group, aromatic hydrocarbon groups with 6 to 12 carbon atoms, and alkoxy groups with 1 to 8 carbon atoms; and a, b, c, and d are an integer including zero (0) and satisfy $a+b+c+d \geq 1$.

Specific examples of aliphatic hydrocarbon groups in this silicone compound include chain-type aliphatic hydrocarbon groups, such as methyl, propyl, butyl, hexyl, octyl, decyl, trifluoropropyl, and glycidyloxypropyl groups, and alicyclic hydrocarbon groups, such as cyclohexyl and methylcyclohexyl groups.

Specific examples of aromatic hydrocarbon groups include phenyl, p-tolyl, and biphenyl groups.

Specific examples of alkoxy groups include methoxy, ethoxy, phenoxy, octyloxy, and tert-butoxy groups.

The type of $R_1$ to $R_{12}$ and the value of a, b, c, and d are not particularly important and are not particularly limited so far as the silicone compound is soluble with the polysilane and the organic solvent and the formed film is transparent. When the compatibility is taken into consideration, the silicone compound preferably has the same hydrocarbon group as the polysilane. For example, when a phenylmethyl-type polysilane is used, the use of a phenylmethyl-type or diphenyl-type silicone compound is preferred. A silicone compound, wherein at least two of $R_1$ to $R_{12}$ is an alkoxy group having 1 to 8 carbon atoms, that is, a silicone compound having two or more alkoxy groups per molecule, can be utilized as a crosslinking agent. Examples of this type of silicone compound include methylphenylmethoxysilicones having an alkoxy group content of 15 to 35% by weight and phenylmethoxysilicones having an alkoxy group content of 15 to 35% by weight.

The molecular weight of the silicone compound is suitably not more than 10000, preferably not more than 3000. In this connection, as described above, when the degree of branching of the branched polysilane compound is not less than 2%, the light transmittance of the material increases with increasing the degree of branching. The upper limit of the degree of branching is preferably 50% from the viewpoint of the solubility of the branched polysilane in an organic solvent to prepare a polymer solution. The blending ratio of the silicone compound to the polysilane compound is preferably 40 to 90% by weight. In this blending ratio, a significant improvement in stability of refractive index against heat, which has been difficult to realize in the conventional polymer materials, can be realized. By virtue of this, polymer materials and polymer films can be realized which, when the temperature is changed from room temperature to a high temperature, for example, about 280° C., undergo substantially no change in refractive index. Further, the use of the branched polysilane compound can realize polymer materials and polymer films using the same which have very low polarization dependency of refractive index.

The polysilane compound or the silicone compound may be a deuterated, or partially or wholly halogenated, particularly fluorinated polysilane or silicone compound from the viewpoint of reducing optical absorption loss attributable to CH or OH groups. In this case, the optical loss attributable to these absorption groups can be significantly reduced. Therefore, polymer materials and polymer films using the same can be realized which have low optical propagation loss by virtue of very low wavelength dependency and suppression of absorption at specific wavelengths, and have high light transmittance over a wide wavelength range and, when a photoacid generator is further contained, can cause a change in refractive index with high sensitivity and high resolution upon the application of ultraviolet light. In addition, the stability of refractive index against heat can be improved. This can significantly expand the range of applications of polymer materials and polymer films as optical materials and components.

When the silicone compound is crosslinkable or comprises an alkoxy group, this silicone compound can be homogeneously mixed into the branched polysilane compound. Further, the silicone compound can be easily dissolved in an organic solvent, such as toluene, to prepare a homogeneous solution. The polymer solution using the silicone compound can form a homogeneous structure or film which is free from optical scattering center.

Further, both the branched polysilane compound and the silicone compound can be easily dissolved in an organic solvent, such as toluene. Therefore, they can be easily mixed together at the above desired mixing ratio in an identical organic solvent.

Further, the present inventor has found for the first time a great feature that the above polymer material solution can be coated onto various substrates and, even when the coated substrates are heated at a temperature of 100° C. to 280° C. to form a film, the film undergoes substantially no change in refractive index in the above temperature range. By virtue of this, the polymer film can be utilized as various optical films. For example, electronic components or optical components may be soldered to a portion close to this polymer film. A heater can be provided at a position close to the polymer film to perform control the characteristics of electronic or optical devices by regulating the temperature.

Further, the provision of an ultraviolet cut layer on the surface of the polymer structure or polymer film, which is transparent and has good stability of refractive index against heat, can stabilize optical characteristics for a long period of time.

Photoacid Generator

The photoacid generator is not particularly limited, and any compound may be used so far as the compound can generate an acid upon exposure to light. Examples of photoacid generators include unsubstituted or substituted 2,4,6-tris(trihalomethyl)-1,3,5-triazine. Examples of substituted 2,4,6-tris(trihalomethyl)-1,3,5-triazine include 2,4,6-tris(trihalomethyl)-1,3,5-triazine which has been substituted at the 2-position or at the 2- and 4-positions. Substituents in these compounds include optionally substituted aliphatic and aromatic hydrocarbon groups. Triazine having a trichloromethyl group is generally used.

The addition of the photoacid generator enables Si—Si bond to be efficiently cleaved by an acid produced from halogen radicals and the photoacid generator.

The branched polysilane compound, the silicone compound, and the photoacid generator are highly soluble with an organic solvent, such as toluene, and thus can be dissolved in the organic solvent to prepare a homogeneous solution. This homogeneous ultrafine particle solution as a polymer material solution can be poured into a mold or coated onto the surface of a substrate in an environment not exposed to ultraviolet light, followed by baking to form a desired homogeneous structure or film.

The provision of an ultraviolet cut layer on the surface of the polymer material or the polymer film can suppress exposure of the polymer material or the polymer film to unnecessary ultraviolet light which is causative of a change in refractive index or light transmittance.

Next, a specific example of the preparation of a branched polysilane will be explained.

At the outset, a 100-ml flask equipped with a stirrer was charged with 40 ml of dry toluene and 1.33 g of sodium. The temperature of the contents of the flask was raised to 111° C., and the contents of the flask were stirred at a high speed to finely disperse sodium in toluene. Phenylmethyldichlorosilane (4.21 g) and 0.41 g of tetrachlorosilane were added to the contents of the flask followed by stirring for 3 hr to perform polymerization.

Thereafter, 10 ml of ethanol was added to the reaction mixture to deactivate excess sodium. After washing with water, the separated organic layer was poured into 200 ml of ethanol to precipitate polysilane. The crude polysilane thus obtained was precipitated three times from ethanol. Thus, a branched polymethylphenylsilane having a weight average molecular weight of about 14000 was prepared (yield 30%).

Next, for comparison, a specific example of the preparation of a linear polysilane will be explained.

A 100-ml flask equipped with a stirrer was charged with 40 ml of dry toluene and 1.33 g of sodium. The temperature of the contents of the flask was raised to 111° C., and the contents of the flask were stirred at a high speed to finely disperse sodium in toluene. Phenylmethyldichlorosilane (5.16 g) was added to the contents of the flask followed by stirring for 3 hr to perform polymerization. Thereafter, 10 ml of ethanol was added to the reaction mixture to deactivate excess sodium. After washing with water, the separated organic layer was poured into 200 ml of ethanol to precipitate polysilane. The crude polysilane thus obtained was precipitated three times from ethanol. Thus, a linear polymethylphenylsilane having a weight average molecular weight of about 24000 was prepared (yield 40%).

An example of the preparation of a deuterated branched polysilane will be explained.

At the outset, a 100-ml flask equipped with a stirrer was charged with 40 ml of dry toluene and 1.33 g of sodium. The temperature of the contents of the flask was raised to 111° C., and the contents of the flask were stirred at a high speed to finely disperse sodium in toluene. Deuterated phenylmethyldichlorosilane (4.39 g) and 0.41 g of tetrachlorosilane were added to the contents of the flask followed by stirring for 3 hr to perform polymerization. Thereafter, 10 ml of ethanol was added to the reaction mixture to deactivate excess sodium. After washing with water, the separated organic layer was poured into 200 ml of ethanol to precipitate polysilane. The crude polysilane thus obtained was precipitated three times from ethanol. Thus, a deuterated branched polymethylphenylsilane having a weight average molecular weight of about 15000 was prepared (yield 30%).

An example of the preparation of a wholly fluorinated branched polysilane as other branched polysilane will be explained.

At the outset, a 100-ml flask equipped with a stirrer was charged with 40 ml of dry toluene and 1.33 g of sodium. The temperature of the contents of the flask was raised to 111° C., and the contents of the flask were stirred at a high speed to finely disperse sodium in toluene. Phenylmethyldichlorosilane (4.21 g) and 0.41 g of tetrachlorosilane were added to the contents of the flask followed by stirring for 3 hr to perform polymerization. Thereafter, 10 ml of ethanol was added to the reaction mixture to deactivate excess sodium. After washing with water, the separated organic layer was poured into 200 ml of ethanol to precipitate polysilane. The crude polysilane thus obtained was precipitated three times from ethanol. Thus, a branched polymethylphenylsilane having a weight average molecular weight of about 14000 was prepared (yield 30%).

This polymer was pulverized to a size of not more than 140 meshes to prepare a powder which was then introduced into a nickel reaction vessel, followed by evacuation of the reaction vessel. Thereafter, a mixed gas composed of fluorine gas and nitrogen gas in a volume ratio of 1:9 was introduced into the reaction vessel. Next, a reaction was allowed to proceed at room temperature for 24 hr to fluorinate the polymer. After the completion of the reaction, the atmosphere in the reaction vessel was replaced by nitrogen gas, and the sample was taken out of the reaction vessel. Thus, a fluorinated branched polymethylcyclohexylsilane was prepared.

The silicone compound used in the invention is preferably crosslinkable or comprises an alkoxy group.

FIG. 1 is a characteristic curve showing the relationship between the baking temperature of polymer films using polymer materials according to the invention and the refractive index of the polymer films at a wavelength of 633 nm. More specifically, FIG. 1 shows the relationship between the baking temperature of branched polysilane films with silicone added thereto according to the invention and the refractive index of the polymer films at a wavelength of 632.8 nm.

In FIG. 1, the baking temperature is plotted as abscissa against the refractive index as ordinate. L1 represents a characteristic curve for a silicone content of 25% by weight, L2 a characteristic curve for a silicone content of 30% by weight, L3 a characteristic curve for a silicone content of 40% by weight, L4 a characteristic curve for a silicone content of 45% by weight, L5 a characteristic curve for a silicone content of 50% by weight, L6 a characteristic curve for a silicone content of 75% by weight, L7 a characteristic curve for a silicone content of 80% by weight, L8 a characteristic curve for a silicone content of 90% by weight, and L9 a characteristic curve for a silicone content of 130% by weight.

The silicone used was a commercially available methoxy-containing phenylmethylsilicone resin (TSR-165, manufactured by GE Toshiba Silicone). 5% of a triazine photoacid generator was used as a photoacid generator. This polymer film used in the experiment was formed by dissolving the branched polysilane and the silicone at a desired blending ratio in toluene as an organic solvent to prepare a solution, spin coating the solution onto the surface of a silicon substrate, and then prebaking the coating at 120° C. for 20 min to form a film (thickness: about 6 μm). This film was heat treated at various baking temperatures for about 20 min and was then measured for refractive index at room temperature.

As can be seen from FIG. 1, the baking temperature dependency of the refractive index greatly varies according to the blending ratio of silicone. That is, when the blending ratio of silicone (silicone content) is in the range of 40 to 90% by weight, the stability of refractive index against heat is excellent. Therefore, the blending ratio of silicone is preferably 40 to 90% by weight. This fact was found for the first time by the present inventor.

Figure 2:
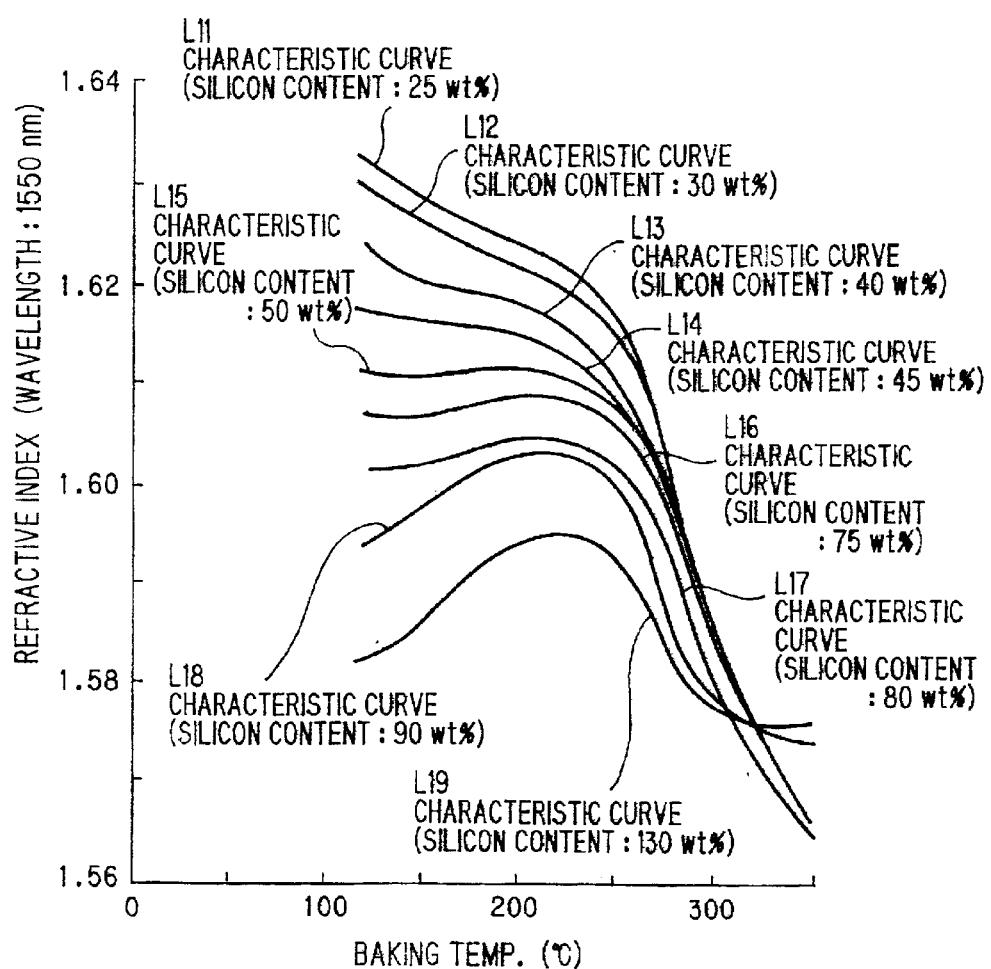
FIG. 2 is a characteristic curve showing the relationship between the baking temperature of polymer films using polymer materials according to the invention and the refractive index of the polymer films at a wavelength of 1550 nm.

FIG. 2 is a characteristic curve showing the relationship between the baking temperature of polymer films using polymer materials according to the invention and the refractive index of the polymer films at a wavelength of 1550 nm. In FIG. 2, the baking temperature is plotted as abscissa against the refractive index as ordinate.

The film used in this experiment was formed under the same conditions as used in the preparation of the film in the experiment shown in FIG. 1. That is, prebaking was carried out at 120° C. for 20 min, a branched polysilane was used, a triazine photoacid generator (5%) was used as the photoacid generator, and the film thickness was brought to about 6 μm by the prebaking at 120° C. In FIG. 2, L11 represents a characteristic curve for a silicone content of 25% by weight, L12 a characteristic curve for a silicone content of 30% by weight, L13 a characteristic curve for a silicone content of 40% by weight, L14 a characteristic curve for a silicone content of 45% by weight, L15 a characteristic curve for a silicone content of 50% by weight, L16 a characteristic curve for a silicone content of 75% by weight, L17 a characteristic curve for a silicone content of 80% by weight, L18 a characteristic curve for a silicone content of 90% by weight, and L19 a characteristic curve for a silicone content of 130% by weight.

As can be seen from FIG. 2, also for the wavelength 1550 nm, when the blending ratio of silicone (silicone content) is in the range of 40 to 90% by weight, the stability of refractive index against heat is excellent.

Figure 3:
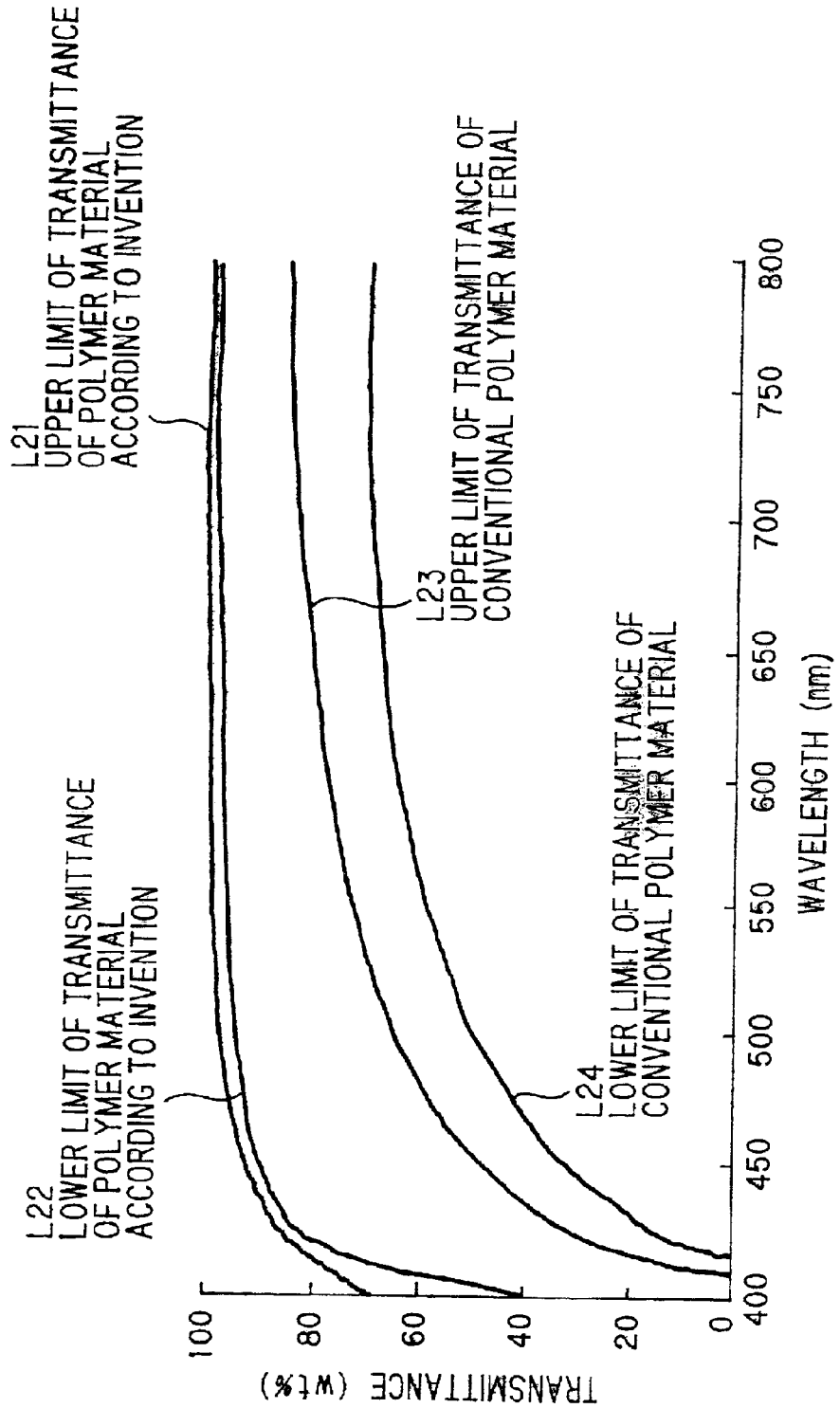
FIG. 3 is a characteristic curve showing the relationship between the light transmittance of polymer films using a polymer material according to the invention and a conventional polymer materials and the wavelength.

FIG. 3 is a characteristic curve showing the relationship between the light transmittance of polymer films using a polymer material according to the invention and a conventional polymer material and the wavelength. The wavelength is plotted as abscissa against the transmittance as ordinate. In FIG. 3, L21 represents the upper limit of the transmittance of a polymer material (branched polysilane) according to the invention, L22 the lower limit of the transmittance of the polymer material (branched polysilane) according to the invention, L23 the upper limit of the transmittance of a conventional polymer material (linear polysilane), and L24 the lower limit of the transmittance of the conventional polymer material (linear polysilane).

FIG. 3 shows a comparison of the experimental results for the branched polysilane material according to the invention with the experimental results for the conventional linear polysilane material. In this experiment, the polysilane material has been brought to a film (thickness: about 300 µm) to evaluate the transmittance. As is apparent from FIG. 3, the branched polysilane according to the invention has better transmittance characteristics, that is, higher transparency, than the conventional linear polysilane. Further, since better transmittance characteristics are obtained in longer wavebands, good transmittance characteristics can be expected in wavebands for communication, i.e., 0.6 µm band, 0.8 µm band, 1.3 µm band, and 1.55 µm band.

Figure 4:
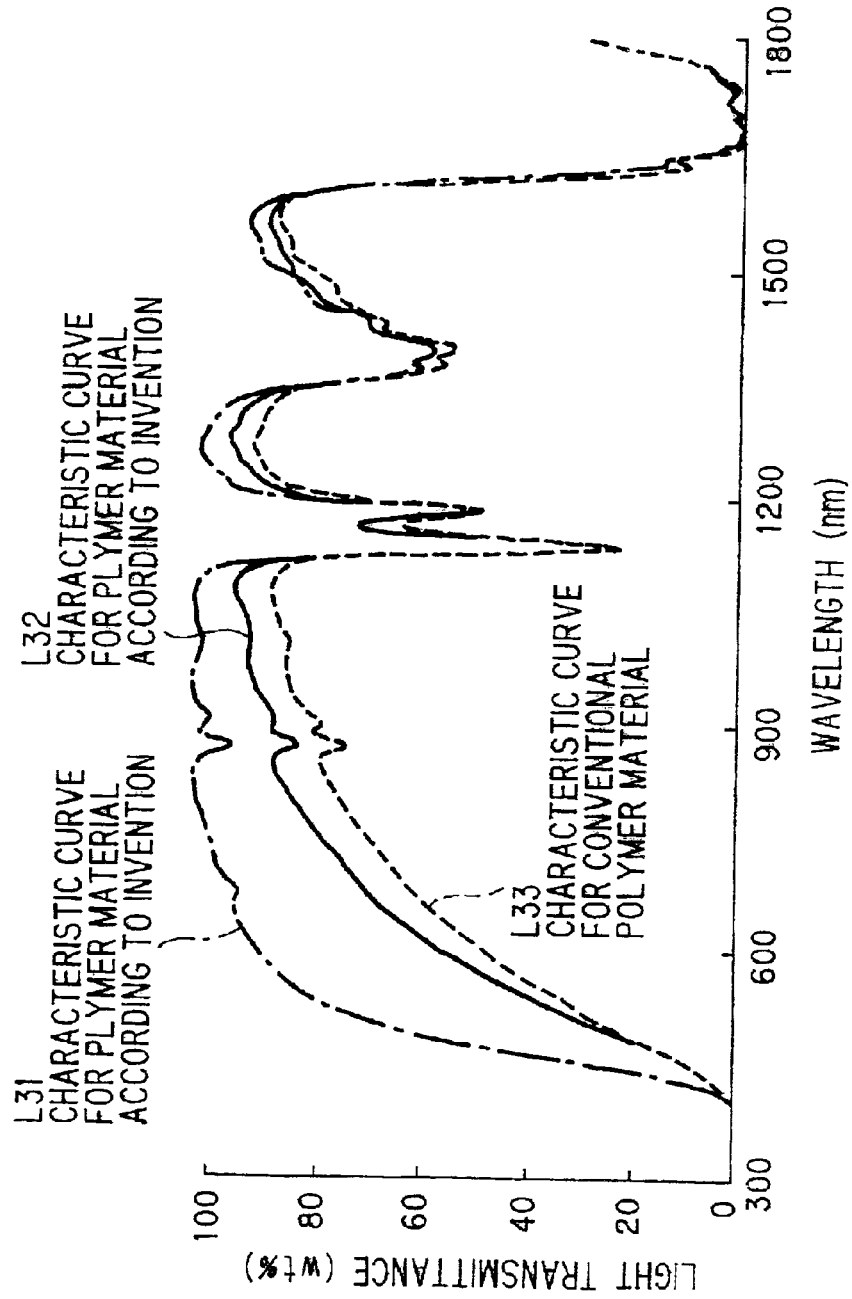
FIG. 4 is a characteristic curve showing the relationship between the light transmittance of polymer films using polymer materials according to the invention and a conventional polymer materials and the wavelength.

FIG. 4 is a characteristic curve showing the relationship between the light transmittance of polymer solutions using polymer materials according to the invention and a conventional polymer material and the wavelength. In FIG. 4, the wavelength is plotted as abscissa against the light transmittance as ordinate. L31 represents a characteristic curve for a polymer material of the invention (branched polysilane; degree of branching 20%), L32 a characteristic curve for a polymer material of the invention (branched polysilane; degree of branching 3%), and L33 a characteristic curve for a conventional polymer material (linear polysilane; degree, of branching 0%). Toluene was used as an organic solvent.

Here for all the samples, 50% by weight of the silicone compound was added to the polysilane for comparison under identical conditions. As is apparent from FIG. 4, the higher the degree of branching, the better the light transmittance. This fact was found for the first time by the present inventor.

Figure 5:
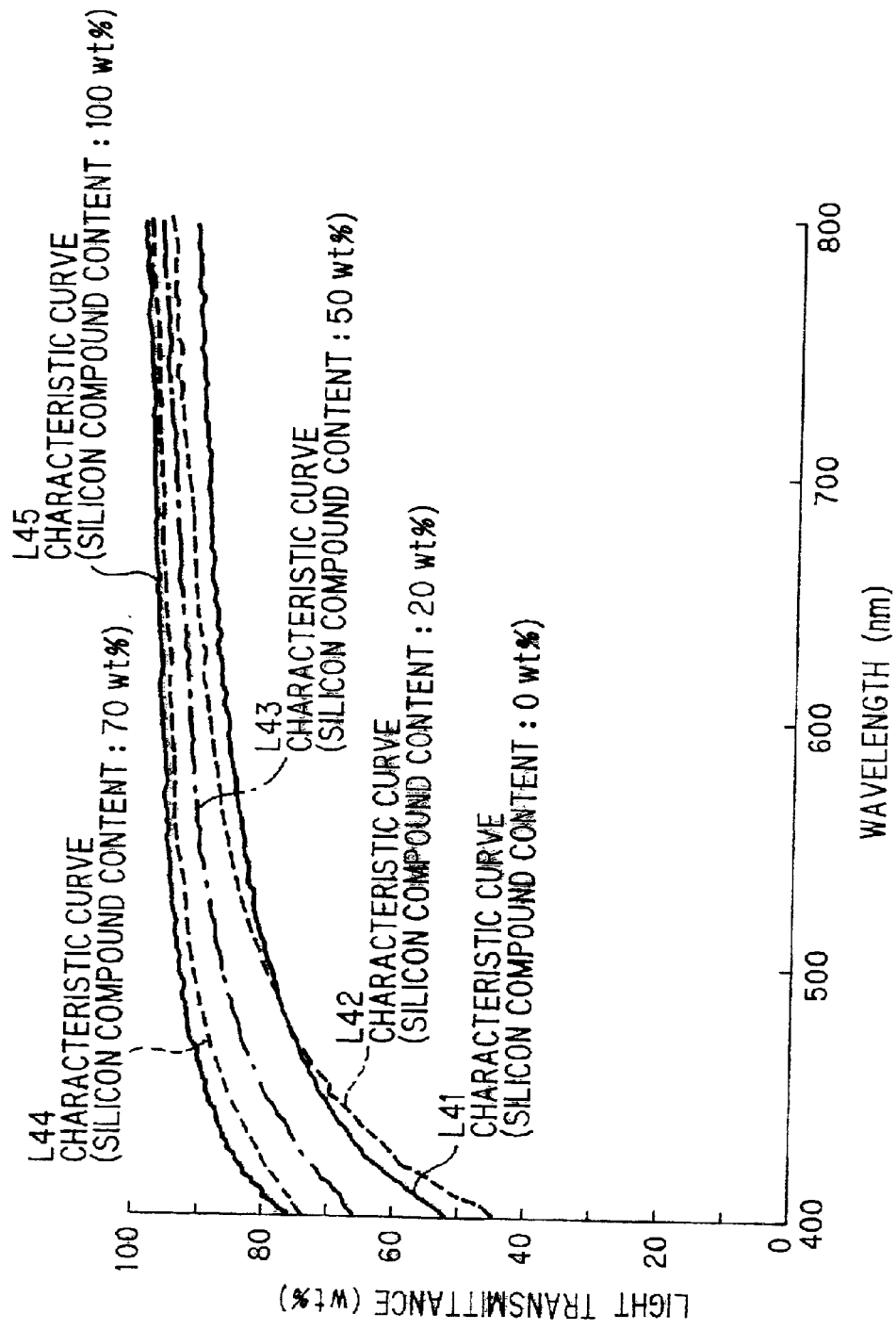
FIG. 5 is a characteristic curve showing the relationship between the light transmittance of silicone compound-containing polymer films, according to the invention, with the silicone compound content being varied and the wavelength.

FIG. 5 is a characteristic curve showing the relationship between the light transmittance of silicone compound-containing polymer films, according to the invention, with the silicone compound content being varied and the wavelength. That is, FIG. 5 shows the results of measurement of light transmittance characteristics for polymer films (thickness: about 300 µm) with the amount of the silicone compound added to the branched polysilane compound being varied. In FIG. 5, the wavelength is plotted as abscissa against the light transmittance as ordinate. L41 represents a characteristic curve for a silicone compound content of 0% by weight, L42 a characteristic curve for a silicone compound content of 20% by weight, L43 a characteristic curve for a silicone compound content of 50% by weight, L44 a characteristic curve for a silicone compound content of 70% by weight, and L45 a characteristic curve for a silicone compound content of 100% by weight. The thickness of the polymer films was about 300 µm.

Also from these results, it is apparent that the light transmittance increases with increasing the silicone compound content. This fact was found for the first time by the present inventor. From the viewpoint of the stability of refractive index against heat, however, the silicone compound content is preferably in the range of 40 to 90% by weight.

Next, the results of measurement of optical propagation loss characteristics for a conventional linear polysilane film, a film of a branched polysilane per se used in the invention, and a branched polysilane film with silicone added thereto according to the invention will be explained. For each polysilane film, the thickness was about 6 µm, and the optical propagation loss was measured at a wavelength of 1300 nm.

The results of measurement are shown in Table 1.

TABLE 1

| Type of film | Propagation loss, dB/cm (1300 nm) |
|---|---|
| Linear polysilane film | 1.7 to 2.2 |
| Branched polysilane film | 0.8 to 1.0 |
| Branched polysilane film with 50 wt % of silicone added thereto | 0.1 to 0.19 |

The optical propagation loss of the conventional linear polysilane film was 1.7 dB/cm to 2.2 dB/cm. On the other hand, the optical propagation loss of the film of the branched polysilane used in the invention was 0.8 dB/cm to 1.0 dB/cm, that is, clearly lower than that of the conventional linear polysilane film. The branched polysilane film with 50% by weight of the silicone added thereto according to the invention had an optical propagation loss of 0.1 dB/cm to 0.19 dB/cm which was much lower than the optical propagation loss 1.2 dB/cm to 1.5 dB/cm of the conventional linear polysilane film. Further, there was a tendency that the optical propagation loss decreased with increasing the silicone content.

When the stability of refractive index against heat is taken into consideration, however, the silicone content is preferably in the range of 40 to 90% by weight.

The same experiment as described above was repeated, except that, for the branched polysilane film with 50% by weight of silicone added thereto, the branched polysilane was a deuterated branched polysilane in one sample and was a fluorinated branched polysilane in another sample. As a result, for both the samples, a further lowered optical propagation loss of 0.01 dB/cm to 0.1 dB/cm was obtained.

As can be seen from FIGS. 1 and 2, the baking temperature of the polymer film is preferably 100 to 280° C. When baking is carried out in this temperature range, the Si—Si bond in the main chain of the polysilane is held without being cleaved. Further, the decomposition of the side chain, for example, a phenyl group, does not occur.

The optical characteristics can be stably maintained for a long period of time by forming an ultraviolet cut layer on the surface of a structure prepared by pouring the polymer solution into a mold, or on the surface of a film formed by coating the polymer solution onto the surface of a substrate.

In this case, the steps of pouring of the polymer solution, coating of the polymer solution, baking and the like are preferably carried out in an environment not exposed to ultraviolet light.

Next, an experiment, which demonstrates that the effect of stabilizing the refractive index against heat varies depending upon the type of a sensitizer added, will be explained.

Figure 6:
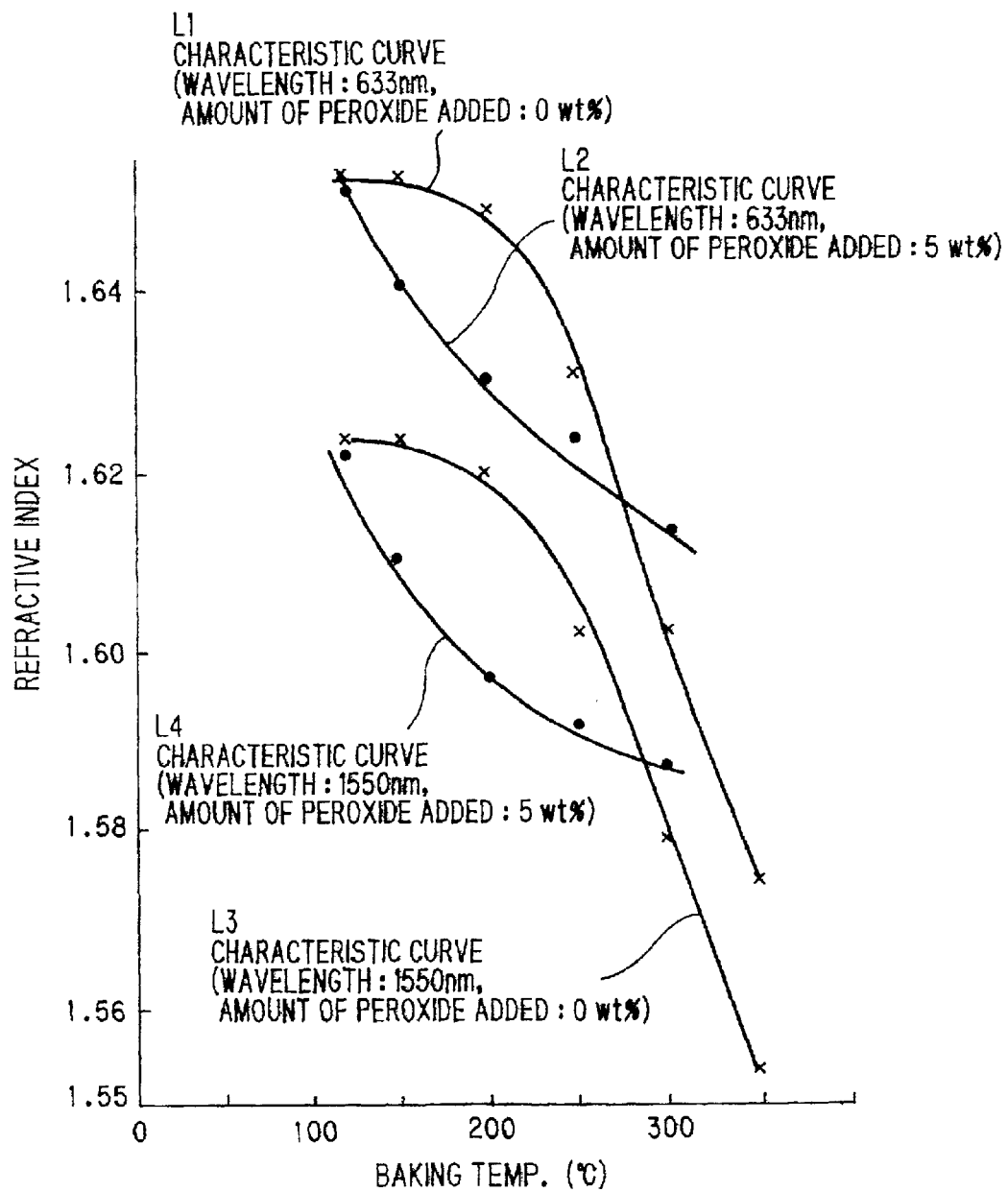
FIG. 6 is a characteristic curve showing the relationship between the baking temperature of polymer materials using a peroxide as a photoacid generator and the refractive index of the polymer materials.

FIG. 6 is a diagram showing the relationship between the baking temperature of polymer materials using a peroxide as a photoacid generator and the refractive index of the polymer materials. Specifically, FIG. 6 shows a change in refractive index as a function of baking temperature for a branched polysilane film with 50% of a commercially available methoxy-containing phenylmethylsilicone resin (TSR-165, manufactured by GE Toshiba Silicone) being added as a silicone compound and the same branched polysilane film as described above except for the addition of 5% of a photoreactive peroxide as a sensitizer.

In FIG. 6, the baking temperature is plotted as abscissa against the refractive index as ordinate. L1 represents a characteristic curve as measured at a wavelength of 633 nm for a polymer material with a peroxide content of 0% by weight, L2 a characteristic curve as measured at a wavelength of 633 nm for a polymer material with a peroxide content of 5% by weight, L3 a characteristic curve as measured at a wavelength of 1550 nm for a polymer material with a peroxide content of 0% by weight, and L4 a characteristic curve as measured at a wavelength of 1550 nm for a polymer material with a peroxide content of 5% by weight. The refractive index was measured at room temperature.

As is apparent from FIG. 6, the film with no peroxide being added thereto had better stability of refractive index against heat than the film with 5% of peroxide being added thereto, and, in the case of the film with no peroxide being added thereto, the refractive index substantially remained unchanged up to a temperature around 200° C. Further, the results show that the film with 5% of peroxide being added thereto has very poor heat stability. That is, it can be said that the peroxide is unfavorable as the sensitizer.

Next, an experiment on a polymer film with a trichloromethyltriazine photoacid generator being added as the sensitizer will be explained.

Figure 7:
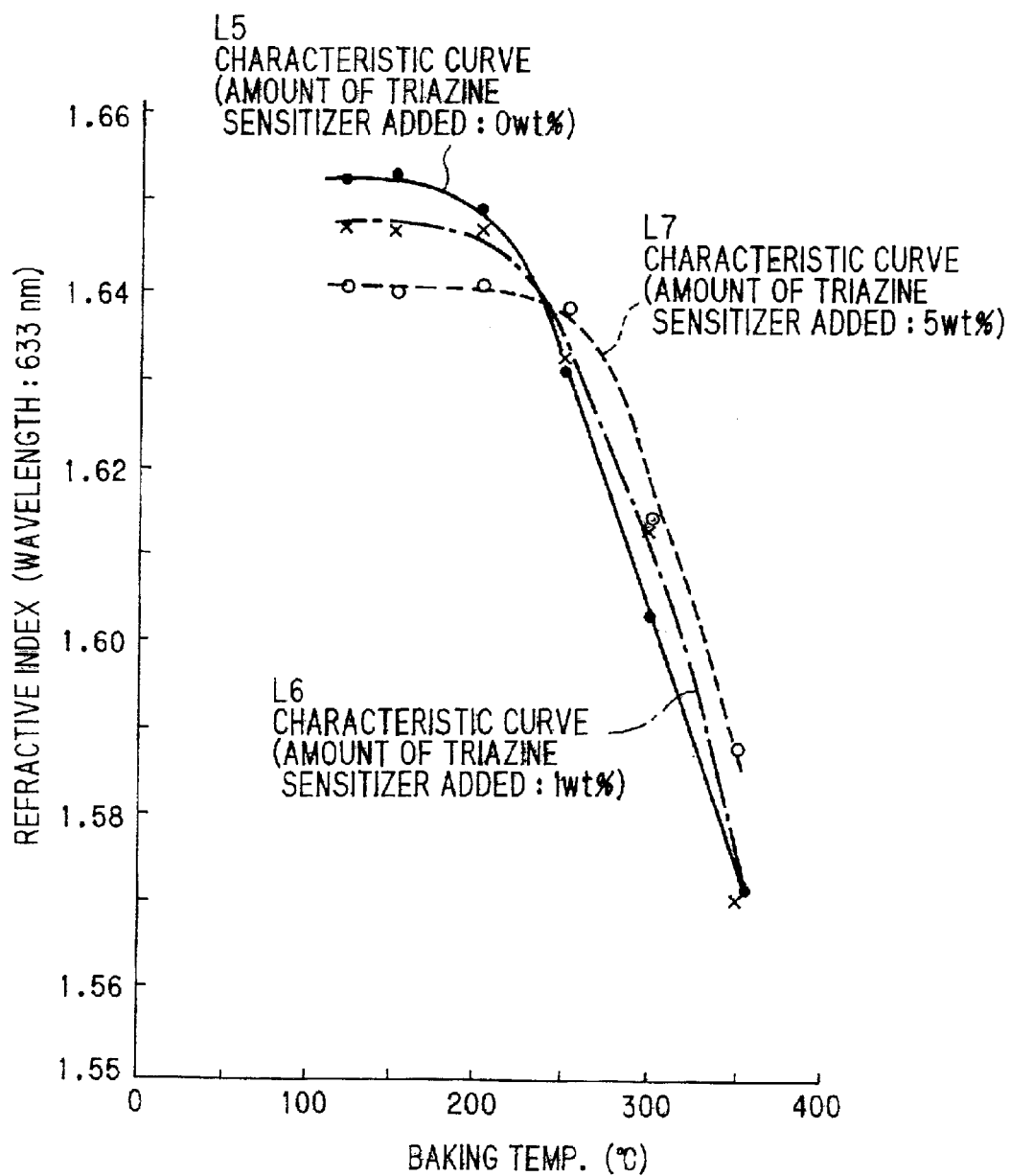
FIG. 7 is a characteristic curve showing the results of an experiment on the stability of refractive index at a wavelength of 633 nm of polymer films of polymer materials using a triazine sensitizer as a photoacid generator against baking temperature.
Figure 8:
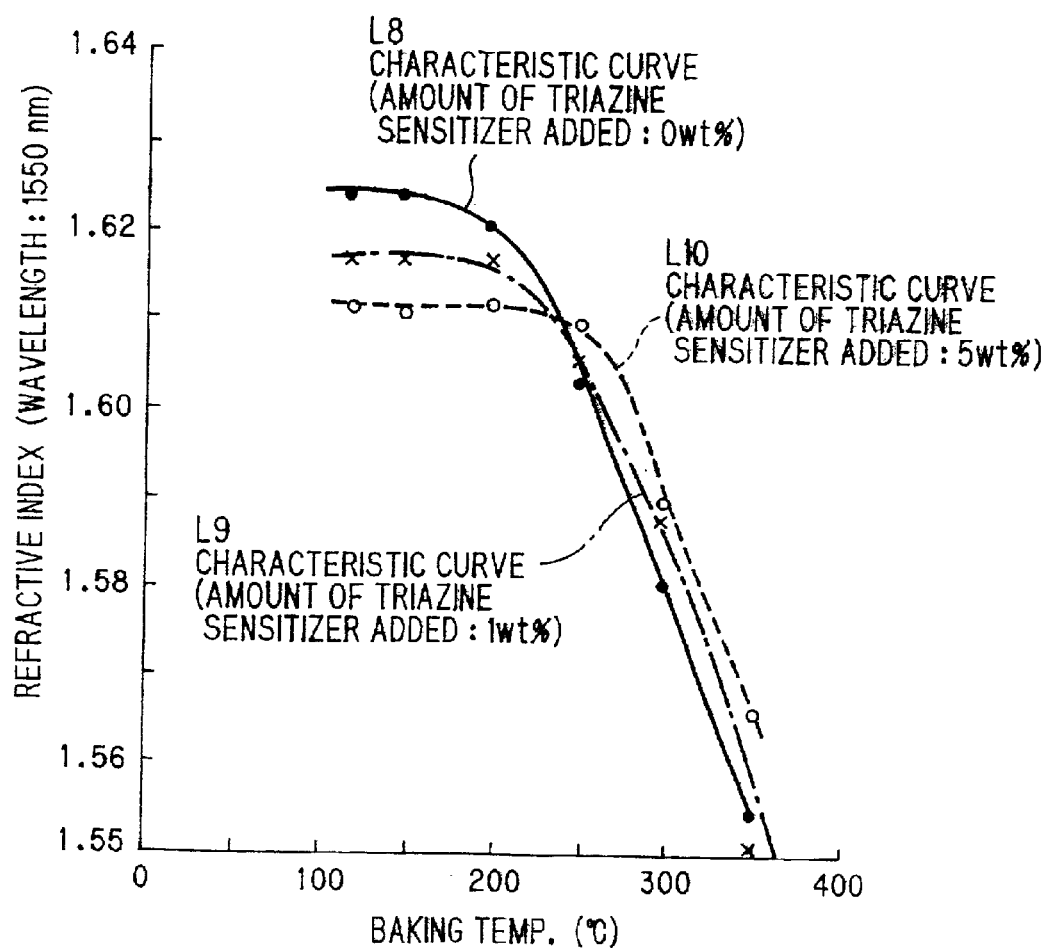
FIG. 8 is a characteristic curve showing the results of an experiment on the stability of refractive index at a wavelength of 1550 nm of polymer films of polymer materials using a triazine sensitizer as a photoacid generator against baking temperature.

FIG. 7 is a diagram showing the results of measurement of the stability of refractive index against heat at a wavelength of 633 nm as a function of baking temperature. FIG. 8 is a diagram showing refractive index characteristics measured at a wavelength of 1550 nm as a function of the baking temperature. In FIGS. 7 and 8, the baking temperature was plotted as abscissa against the refractive index as ordinate. p-Methoxystyryltrichloromethyltriazine was used as the trichloromethyltriazine material. FIGS. 7 and 8 show the results of measurement on the baking temperature dependency of refractive index of films with the blending ratio of trichloromethyltriazine being varied to 0, 1, and 5% by weight. L5 represents a characteristic curve as measured at a wavelength of 633 nm for a film with the amount of the triazine sensitizer added being 0%, L6 a characteristic curve as measured at a wavelength of 633 nm for film with the amount of the triazine sensitizer added being 1%, L7 a characteristic curve as measured at a wavelength of 633 nm for film with the amount of the triazine sensitizer added being 5%, L8 a characteristic curve as measured at a wavelength of 1550 nm for a film with the amount of the triazine sensitizer added being 0%, L9 a characteristic curve as measured at a wavelength of 1550 nm for film with the amount of the triazine sensitizer added being 1%, and L10 a characteristic curve as measured at a wavelength of 1550 nm for film with the amount of the triazine sensitizer added being 5%.

As is apparent from FIGS. 7 and 8, the stability of refractive index against heat improves with increasing the amount of trichloromethyltriazine added. When the amount of trichloromethyltriazine added is excessive, however, light transmittance is deteriorated. For this reason, the blending ratio of trichloromethyltriazine is preferably 1 to 5.5% by weight.

FIG. 9 is a table showing the relationship between the structure of sensitizers and the sensitivity and the like.

For the sensitizers, a comparison of the relative sensitivity, the chemical structure, the maximum absorption wavelength, the transmittance, and the solubility in toluene was made. In this case, for the relative sensitivity, the exposure necessary for halving the UV absorption of sensitizer-free polysilane was supposed to be a relative sensitivity of 1. The transmittance was measured in a cell having a size of 10 mm by heating samples, prepared by adding sensitizers to silicone resin, at 250° C. for 30 min.

As is apparent from FIG. 9, materials, which have a light transmittance of substantially 100% as measured at a wavelength of 830 nm and high solubility in toluene, are more preferred. That is, in the case of polymer materials for optical communication for 800 nm band, 1300 nm band, and 1550 nm band and polymer films, the use of the trichloromethyltriazine material having high light transmittance is preferred.

Next, explanation will be given on preferred embodiments wherein ultraviolet light is exposed to a single polymer material and a single polymer film to cause a change in refractive index, whereby a desired refractive index value is realized.

Figure 10:
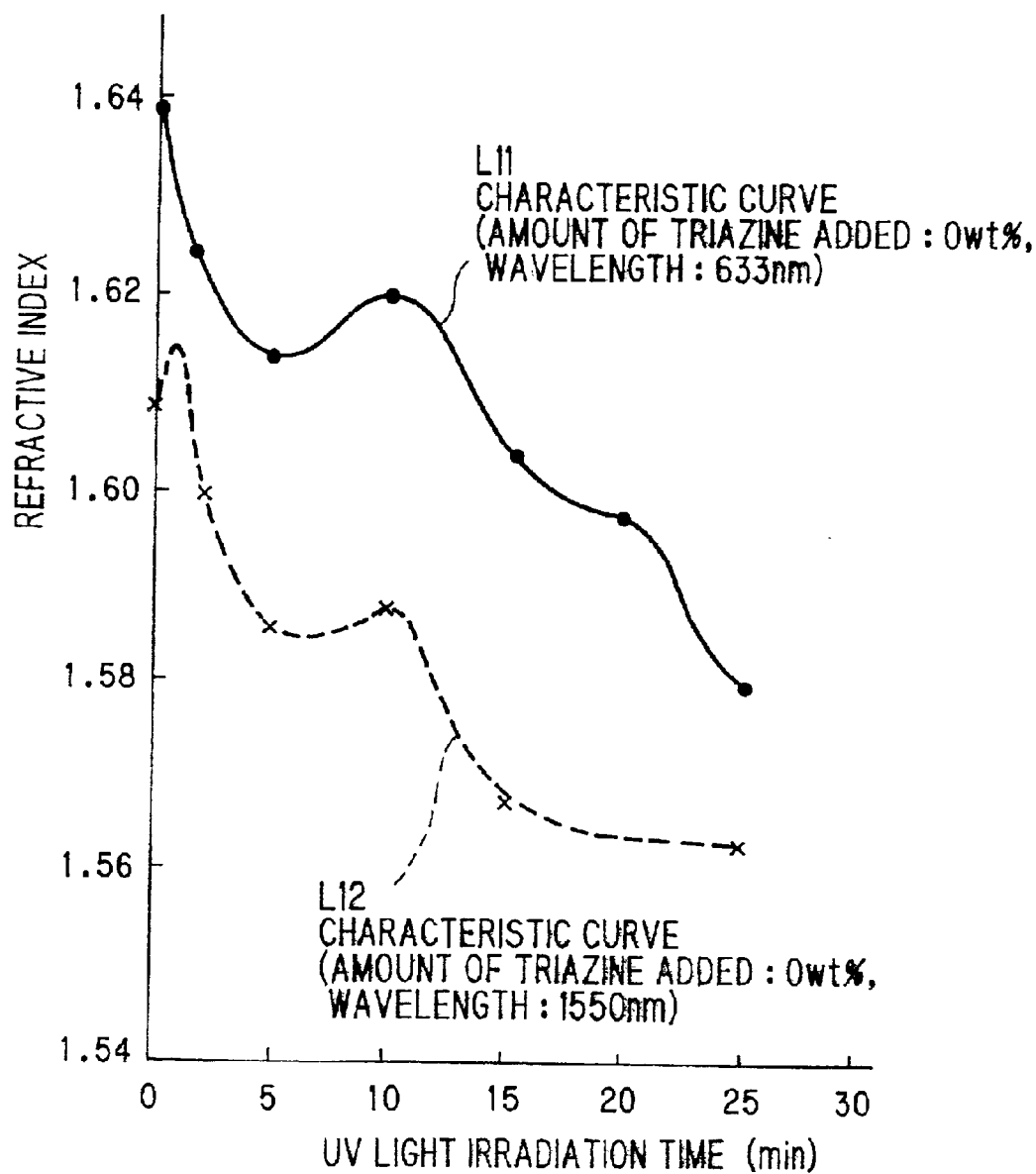
FIG. 10 is a characteristic curve showing the relationship between the irradiation time of ultraviolet light and the refractive index for a branched polysilane film with a silicone content of 50% and a trichloromethyltriazine content of 0% shown in FIG. 7.
Figure 11:
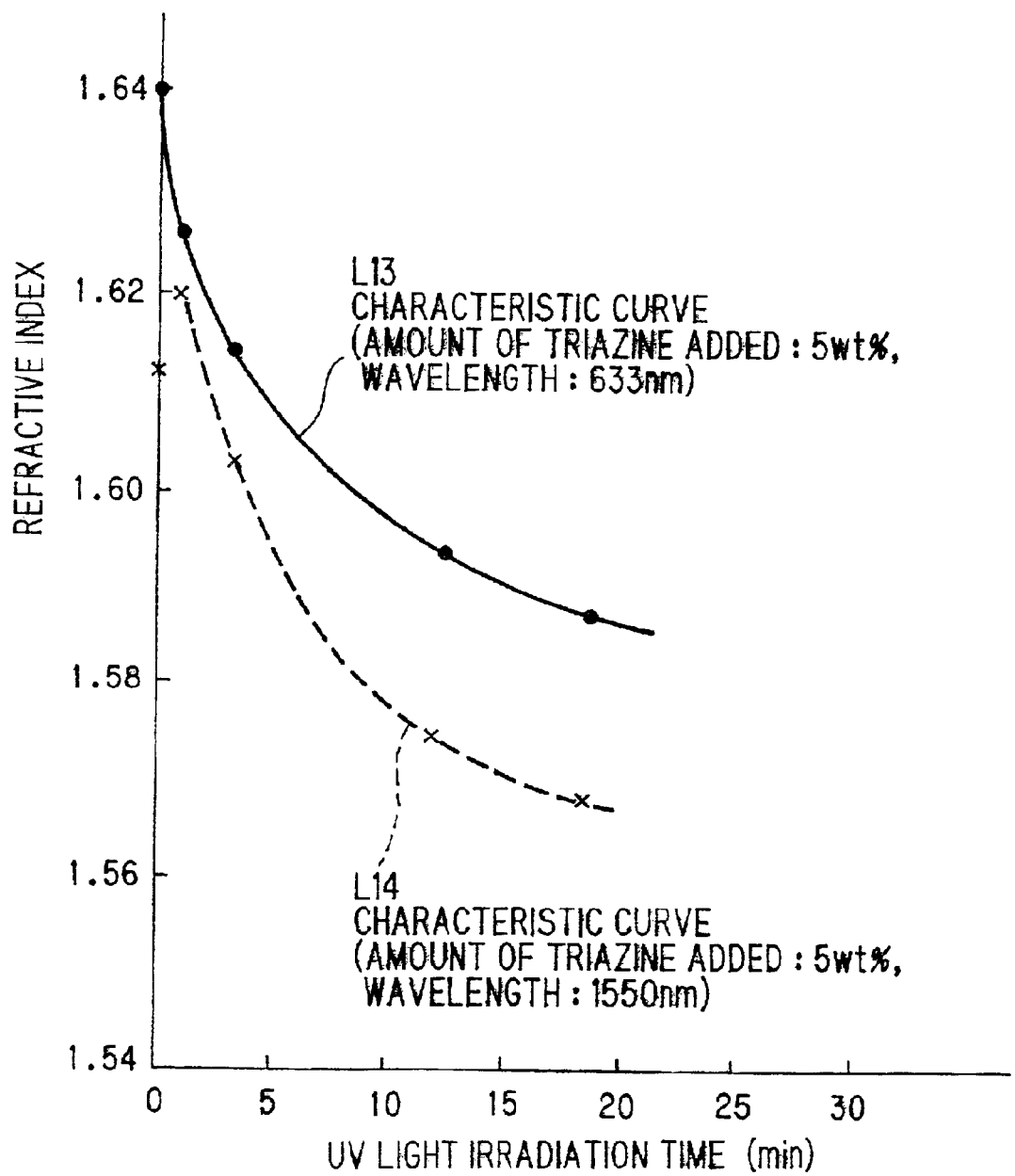
FIG. 11 is a characteristic curve showing the relationship between the irradiation time of ultraviolet light and the refractive index for a branched polysilane film with a silicone content of 50% and a trichloromethyltriazine content of 5% shown in FIG. 8.

FIG. 10 is a diagram showing the relationship between the time of exposure of ultraviolet light to a branched polysilane film (silicone content 50% by weight) with a trichloromethyltriazine content of 0% by weight as shown in FIG. 7 and the refractive index of the branched polysilane film as measured at wavelengths of 633 nm and 1550 nm, and FIG. 11 a diagram showing the relationship between the time of exposure of ultraviolet light to a branched polysilane film (silicone content 50% by weight) with a trichloromethyltriazine content of 5% by weight as shown in FIG. 8 and the refractive index of the branched polysilane film as measured at wavelengths of 633 nm and 1550 nm. In FIGS. 10 and 11, UV irradiation time is plotted as abscissa against refractive index as ordinate. In FIGS. 10 and 11, L11 is a characteristic curve as measured at a wavelength of 633 nm for a triazine content of 0% by weight, L12 a characteristic curve as measured at a wavelength of 1550 nm for a triazine content of 0% by weight, L13 a characteristic curve as measured at a wavelength of 633 nm for a triazine content of 5% by weight, and L14 a characteristic curve as measured at a wavelength of 1550 nm for a triazine content of 5% by weight.

Here the ultraviolet light was exposed from a 150 W mercury/xenon lamp through a fiber bundle scope to the surface of the film, and the refractive index of the film was measured as a function of the ultraviolet irradiation time. The output of the fiber bundle scope was 1200 mJ/cm$^2$.

As shown in FIG. 10, when the content of the trichloromethyltriazine is 0% by weight, the refractive index is discontinuously varied in relation to the ultraviolet irradiation time. This means that it is difficult to provide a desired refractive index by regulating the irradiation time. By contrast, as can be seen from FIG. 11, for the film with a trichloromethyltriazine content of 5% by weight, the refractive index can be continuously varied in relation to the ultraviolet irradiation time. Further, the response of the refractive index to ultraviolet light is quick, indicating that the sensitivity is high. This effect is clearly attributable to the addition of trichloromethyltriazine.

Here the addition of a trichloromethyltriazine material, which has high light transmittance at long wavebands in this system, has a maximum absorption wavelength close to the ultraviolet absorption wavelength of the polysilane compound, and has a highest possible melting point, is preferred.

According to the first and second features of the invention, the following very useful effects, which could not have been offered by the prior art, can be attained.

(1) The addition of a silicone compound to a branched polysilane compound in a predetermined blending ratio can provide polymer materials and polymer films using the same which have excellent stability of refractive index against heat. This can realize polymer materials and polymer films which, even when heat treated at 100° C. to 280° C. or even when the ambient temperature increased to the above temperature range, undergo substantially no change in refractive index.

(2) The present inventor has found for the first time that polymer films having higher light transmittance can be realized by enhancing the degree of branching of the branched polysilane compound.

(3) Further, it was found that the addition of the silicone compound can provide polymer materials having high light transmittance, that is, having high transparency to light. Further, the formation of polymer films using these polymer materials can realize films having low optical propagation loss. The optical propagation loss decreases with increasing the silicone content. When the stability of refractive index against heat is taken into consideration, however, the silicone content is preferably in the range of 40 to 90% by weight. The branched polysilane compound can be easily deuterated, or can be easily partially or wholly fluorinated. The deuteration or fluorination can significantly lower the optical absorption loss attributable to CH and OH groups and thus can realize polymer materials or polymer films which have substantially no optical absorption loss at a specific wavelength and have low optical propagation loss.

(4) The branched polysilane compound and the silicone compound can be easily mixed together in an organic solvent to prepare a solution which can be poured into a mold, followed by curing to prepare a solid structure. Alternatively, the solution may be coated onto the surface of various substrates to form a film having high light transmittance.

(5) The formation of an ultraviolet cut layer on the surface of the above structure and film can realize an optical structure and an optical film which are stable for a long period of time.

In summary, the first and second features of the invention can realize highly reliable polymer materials and polymer films.

According to the third and fourth features of the invention, the following very useful effects can be attained.

(1) In polymer structures and polymer films using the polymer materials according to the invention, even when the preparation temperature (baking temperature) is increased to about 250° C. or even when the ambient temperature during the use of the polymer structures and polymer films rises to about 250° C., there is substantially no change in refractive index.

(2) When ultraviolet light is exposed to the above structures and films to realize a desired refractive index, the refractive index can be changed with high sensitivity and high resolution upon exposure to ultraviolet irradiation energy.

(3) The photoacid generator is preferably a trichloromethyltriazine material, and the blending ratio thereof is 1 to 5.5% by weight from the viewpoint of realizing the stability of refractive index against heat and high light transmittance at long wavebands. When the amount of the photoacid generator added is in the above range, the compatibility of the photoacid generator with toluene is good and, thus, the photoacid generator, together with the branched polysilane compound and the silicone compound, can be homogeneously dissolved in toluene. Among triazine compounds, those, which have high optical transmittance at long wavebands, have maximum absorption wavelength close to the ultraviolet absorption wavelength of the polysilane compound, and have a highest possible melting point, are preferably added. The addition of the triazine enables the upper limit of the temperature, at which the refractive index to be maintained on a substantially given level, to be increased. Further, a change in refractive index upon the application of ultraviolet light can be realized with high resolution and high sensitivity.

(4) Polymer materials and polymer films using the same according to the invention can offer the above effects through a combination of a branched polysilane compound having a predetermined degree of branching, a silicone compound added in a predetermined amount, and a photoacid generator, preferably a trichloromethyltriazine photoacid generator, added in a predetermined amount.

In summary, the third and fourth features of the invention can realize highly reliable polymer materials and polymer films.

The invention has been described in detail with particular reference to preferred embodiments, but it will be understood that variations and modifications can be effected within the scope of the invention as set forth in the appended claims.

What is claimed is:

1. A polymer material comprising a branched polysilane compound and, blended with the branched polysilane compound, a predetermined amount of a silicone compound and a predetermined amount of a sensitizer, wherein the sensitizer consists of a photoacid generator.

2. The polymer material according to claim 1, wherein the branched polysilane compound has a degree of branching of not less than 2% and not more than 50%.

3. The polymer material according to claim 1, wherein the blending ratio of the silicone compound to the polysilane compound is 40 to 90% by weight.

4. The polymer material according to claim 1, wherein the polysilane compound is a compound wherein a silicon atom is combined to silicon atoms, as well as to a hydrocarbon group, an alkoxy group, or a hydrogen atom.

5. A polymer material comprising a branched polysilane compound and a silicone compound blended with the branched polysilane compound in a predetermined blending ratio, wherein the polysilane compound comprises a deuterated branched polysilane compound.

6. The polymer material according to claim 1, wherein the polysilane compound comprises a partially or wholly halogenated branched polysilane compound.

7. The polymer material according to claim 1, wherein the silicone compound is crosslinkable or comprises an alkoxy group.

8. A polymer material comprising a branched polysilane compound and a silicone compound blended with the branched polysilane compound in a predetermined blending ratio, wherein the silicone compound comprises a deuterated silicone compound.

9. The polymer material according to claim 1, wherein the silicone compound is a partially or wholly halogenated silicone compound.

10. The polymer material according to claim 1, which is in the form of a solution of said compounds dissolved in an organic solvent soluble with said compounds.

11. A polymer film produced by a process comprising the steps of: either pouring a solution of a polymer material comprising a branched polysilane compound, and a sensitizer and a silicone compound blended with the branched polysilane compound wherein said sensitizer consists of a photoacid generator, and said compounds are dissolved in an organic solvent soluble with said compounds into a mold in an environment not exposed to ultraviolet light, or coating the polymer material solution onto a substrate in an environment not exposed to ultraviolet light; and heat treating the mold or the coated substrate in the temperature range of 100 to 280° C. to cure the polymer material.

12. The polymer film according to claim 11, which has an ultraviolet cut layer on its surface.

13. A polymer material comprising a branched polysilane compound and, blended with the branched polysilane compound, a predetermined amount of a silicone compound and a predetermined amount of a photoacid generator, wherein the photoacid generator is a trichloromethyltriazine photoacid generator and the blending ratio of the trichloromethyltriazine photoacid generator to the polysilane compound is not less than 1% by weight and not more than 5.5% by weight.

14. A polymer material comprising a branched polysilane compound and, blended with the branched polysilane compound, a predetermined amount of a silicone compound and a predetermined amount of a photoacid generator, wherein the polysilane compound is a deuterated branched polysilane compound.

15. A polymer material comprising a branched polysilane compound and, blended with the branched polysilane compound, a predetermined amount of a silicone compound and a predetermined amount of a photoacid generator, wherein the silicone compound is a deuterated silicone compound.

16. A polymer film produced by a process comprising the steps of: either pouring a polymer solution comprising a branched polysilane compound and, blended with the branched polysilane compound, a predetermined amount of a silicone compound and a predetermined amount of a sensitizer which consists of a photoacid generator, said compounds being dissolved in an organic solvent soluble with said compounds into a mold in an environment not exposed to ultraviolet light, or coating the polymer material solution onto a substrate in an environment not exposed to ultraviolet light; and heat treating the mold or the coated substrate in the temperature range of 100 to 280° C. to cure the polymer material.

17. The polymer film according to claim 16, which has been exposed to ultraviolet light to change the refractive index of the polymer film.

18. The polymer film according to claim 16, which has an ultraviolet cut layer on its surface.

19. The polymer material according to claim 1, wherein no peroxide is added to the polymer material.

20. A polymer material comprising a branched polysilane compound and a silicone compound blended with the branched polysilane compound in a predetermined blending ratio, wherein the silicone compound is a partially or wholly halogenated silicone compound.

* * * * *